United States Patent
Akashi

(10) Patent No.: US 6,951,626 B2
(45) Date of Patent: Oct. 4, 2005

(54) MANUFACTURING METHOD OF A SNAP FASTENER

(75) Inventor: Shunji Akashi, Toyama-ken (JP)

(73) Assignee: YKK Corporation, Tokyo (JP)

( * ) Notice: Subject to any disclaimer, the term of this patent is extended or adjusted under 35 U.S.C. 154(b) by 675 days.

(21) Appl. No.: 10/086,692

(22) Filed: Mar. 4, 2002

(65) Prior Publication Data

US 2002/0079612 A1 Jun. 27, 2002

Related U.S. Application Data

(60) Continuation of application No. 09/404,900, filed on Sep. 24, 1999, now abandoned, which is a division of application No. 09/266,129, filed on Mar. 10, 1999, now Pat. No. 6,079,083.

(30) Foreign Application Priority Data

Mar. 20, 1998 (JP) .............................................. 10-71907

(51) Int. Cl.$^7$ ................................................ B29C 45/14
(52) U.S. Cl. ...................... 264/273; 264/274; 264/275; 264/257; 264/328.12; 264/161
(58) Field of Search ................................. 264/275, 273, 264/274, 257, 328.12, 161

(56) References Cited

U.S. PATENT DOCUMENTS

| 2,821,764 | A | 2/1958 | Leahy et al. |
| 3,551,963 | A | 1/1971 | Mosher, Jr. et al. |
| 3,800,368 | A | 4/1974 | Simon |
| 3,890,679 | A | 6/1975 | Simon |
| 4,728,557 | A | 3/1988 | Asano et al. |
| 4,761,863 | A | 8/1988 | Sugihara |
| 4,796,339 | A | 1/1989 | Burke |
| 4,805,272 | A | 2/1989 | Yamaguchi |
| 4,805,273 | A | 2/1989 | Burke et al. |
| 5,357,659 | A | 10/1994 | Ackermann |
| 6,199,248 | B1 | 3/2001 | Akashi et al. |

FOREIGN PATENT DOCUMENTS

| EP | 0228293 | 7/1987 |
| JP | 04 117684 | 4/1992 |

*Primary Examiner*—Edmund H. Lee
(74) *Attorney, Agent, or Firm*—Finnegan, Henderson, Farabow, Garrett & Dunner, L.L.P.

(57) ABSTRACT

A female member of a snap fastener with tape comprising a female button made of synthetic resin which is integrally molded on front and back faces of the tape so as to hold a peripheral edge of an attachment hole of the tape having at least one attachment hole and which has an engaging opening to be engaged with a male button at a substantially center portion of the female button. The female button has at least one mold hole extending in a front and back direction of the tape, and at least one portion of the tape extends to an inside of the female button across the mold hole. At least one cut-out recessed in a diameter direction of the female button is defined in a portion of an inner peripheral engaging face of the engaging opening, and a gate burr is formed at a bottom face of the cut-out. Therefore, in the snap button with tape, and a manufacturing method and a mold of the snap button, in spite of a mold with a simple structure having a small number of pairs of pin members, gate burrs are not exposed on a surface, and the snap button can be easily manufactured without a special step for removing the gates, and the button can be firmly secured to the tape.

4 Claims, 9 Drawing Sheets

MANUFACTURING METHOD OF A SNAP FASTENER

This is a continuation of application Ser. No. 09/404,900, filed Sep. 24, 1999, now abandoned which is a divisional of application Ser. No. 09/266,129, filed Mar. 10, 1999, now U.S. Pat. No. 6,079,083, all of which are incorporated herein by reference.

BACKGROUND OF THE INVENTION

1. Field of the Invention

The present invention relates to a snap fastener with tape, which is made of synthetic resin, and a manufacturing method and a mold of the snap fastener.

2. Description of the Related Art

It has been known for a long time to form at least one attachment hole in a single tape, and integrally mold an eyelet or a similar article made of synthetic resin with a desired shape onto front and back faces of the tape such that the eyelet or the article holds a peripheral edge of the attachment hole. As disclosed in U.S. Pat. No. 2,821,764, for example, an attachment hole is formed in a sheet material, and an eyelet made of synthetic resin with a desired shape is integrally molded on front and back faces of the sheet material so as to hold a peripheral edge of the attachment hole. The eyelet is molded as such by clamping the sheet material extending in an annular cavity for molding the eyelet, at a plurality positions at the peripheral edge portion of the attachment hole as a center, by using a plurality of pairs of pin members projecting in the cavity so as to face each other, and by introducing molten resin into the cavity.

In general, if the pin members do not exist in the above-described molding, the peripheral edge of the attachment hole of the sheet material extending in the cavity largely waves in a peripheral direction due to an introducing pressure of the molten resin. At worst, a portion of the peripheral edge may be deflected so as to abut on an inner face of the cavity, so that the sheet material may be exposed at a portion of a surface of the eyelet as a molded product. The invention disclosed in the above U.S. patent has been accomplished by taking notice of that a proper degree of waving of the peripheral edge of the attachment hole in the sheet material increases a strength of securing of the eyelet to the sheet material. In order to obtain the proper degree of waving state, the peripheral edge portion of the attachment hole of the sheet material is clamped by the pin members in the cavity, thereby controlling a degree of the waving.

There is a similar invention that follows the above technical idea of preventing excessive waving, which is as disclosed in European Patent No. 0228293. In the European patent, a fastener member of a snap fastener, not limited to a male button or a female button and including the above-described eyelet, is integrally molded on a tape by a method similar to that in the above U.S. patent.

In the above U.S. patent, however, an inlet for introducing the molten resin into the cavity is formed so as to face the peripheral edge of the attachment hole so that the molten resin introduced into the cavity by injection can smoothly flow to the front and back faces of the attachment hole of the sheet material. In other words, the molten resin introduced from a center of the annular cavity is guided toward an outer diameter in a plane including the attachment hole. The molten resin supplied from the inlet is forwarded respectively to the front and back faces of the sheet material at the peripheral edge of the attachment hole. With this structure, because the sheet material is incorporated with the eyelet at the peripheral edge of the attachment hole in a proper degree of waving state, the securing strength increases.

According to the above invention, however, a thin disk-shaped plate made of synthetic resin is integrally molded at a central opening portion of the molded eyelet, so that a peripheral face of the opening portion of the molded eyelet must be trimmed after removing the thin plate after molding as described in the specification.

In the European patent, on the other hand, because a specific molding method is not disclosed, unlike the above-described U.S. patent, it is unclear how the molten resin is introduced into the cavity. However, according to FIG. 4 showing its representative embodiment, it is apparent that the molten resin is not introduced into the cavity from a portion for forming and the engaging opening of a female member, because upper and lower molds for forming the engaging opening contact with each other at a parting line thereof. Therefore, the European patent is considered to be different from the U.S. patent in this point. However, if an inlet for introducing molten resin communicating with the cavity is formed at a position other than an inner peripheral engaging face of the opening, e.g., a portion adjacent to the pin member on a side for forming the opening, an resin introducing pressure is locally and directly applied to one side of the peripheral edge of the attachment hole of the tape at the beginning of introduction of the molten resin, and thus, a waving phenomenon is liable to be generated.

In order to prevent this moving phenomenon, eight pin members are provided for clamping the tape at positions close to the peripheral edge portion of the attachment hole. Because of this structure, the molds are complicated and the resin flows from one face of the tape to the other face. Thus, a setting of molding conditions for preventing an influence of the flowing of the resin is complicated.

SUMMARY OF THE INVENTION

The present invention has been accomplished to solve the above problems. Specifically, it is an object of the invention to provide a snap fastener with tape which follows a molding principle of the above U.S. patent similarly to the above European patent, wherein a mold has a simple structure with a small number of pairs of pin members, a gate burr is not exposed on a surface, and the gate can be removed without a special step. It is also an object of the invention to provide a manufacturing method and a mold of the snap fastener.

According to a first aspect of the present invention, there are provided a female member and a male member of the snap fastener as follows.

According to the first aspect, there is provided a female member of a snap fastener with tape comprising a female button made of synthetic resin which is integrally molded on front and back faces of the tape so as to hold a peripheral edge of an attachment hole of the tape having at least one attachment hole and which has an engaging opening to be engaged with a male button at a substantially center portion of the female button, wherein the female button has at least one mold hole extending in a front and back direction of the tape, at least one portion of the tape extends to an inside of the female button across the mold hole, at least one cut-out recessed in a diameter direction is defined in a portion of an inner peripheral engaging face of the engaging opening, and a gate burr is formed at a bottom face of the cut-out.

In this aspect of this invention, a strength of securing of the female button to the tape increases because a proper degree of waving of the peripheral edge of the attachment hole of the tape can be obtained, similarly to the above U.S.

patent. Further, because the cut-out is formed at a portion of the inner peripheral engaging face of the engaging opening, a gate in the molding can be formed at the bottom face of the cut-out. Also, the molded gate can be easily fractured and removed by a pushing force generated when the engaging portion of the male button is engaged with the inner peripheral engaging face of the engaging opening. Because the gate burr is formed on the bottom face of the cut-out, there is no problem in appearance of the button, and the female button can be smoothly engaged and disengaged with the male button because the gate burr is formed on an inner side of the inner peripheral engaging face.

Preferably, the gate burr is formed substantially on a straight line connecting a center of the engaging opening and a center of the mold hole. In other words, a gate of the mold is directed to the peripheral edge of the attachment hole of the tape and the tape support members in the cavity. A pressure of the molten resin introduced into the cavity is distributed to the front and back faces of the peripheral edge of the attachment hole of the tape, and is first forwarded to the tape support members. Therefore, the pressure of the resin is not deflected but uniform at portions of the front and back faces of the tape, and the molded resin can be molded integrally with the attachment hole of the tape in a desired coupled state.

Further, according to the first aspect of the invention, there is provided a male member of a snap fastener with the tape comprising a male button made of synthetic resin which is integrally molded on front and back faces of tape over a peripheral edge of an attachment hole of the tape having at least one attachment hole and has an engaging portion to be engaged with a female button at a substantially center portion of the male button, wherein the male button has at least one mold hole extending in a front and back direction of the tape, at least one portion of the tape extends to an inside of the male button across the mold hole, the engaging portion has a neck portion standing from a center of a substrate closing the attachment hole and an engaging head continuous to an upper end of the neck portion, a recess having a bottom face in substantially the same plane as a plane including the attachment hole is formed on a surface of the substrate on an opposite side to the engaging portion, at least one wedge-shaped projecting rib extends from a projecting portion projecting from a center of the bottom face of the recess to reach substantially an outer periphery of substantially the bottom face of the recess, a projecting end face of the projecting portion at the center of the bottom face of the recess is within the recess, and a sub runner fracture burr is formed on the projecting end face.

In this aspect, by making the recess deeper than that of conventional art, a thickness of the substrate of the male button can be thinner than that of conventional art, an amount of resin to be used can be decreased. Further, a strength of the substrate can be reinforced by the wedge-shaped projecting rib.

Further, it is preferable that a plurality of projecting ribs radially extend from the projecting portion as a center. Because the resin is introduced into the cavity from a plurality of portions toward the peripheral edge of the attachment hole of the tape in the molding, flows of the resin to the front and back faces of the tape are uniformed, thus a strength of the entire substrate can also be uniformed.

Further preferably, the projecting streak may be disposed substantially on a straight line connecting a center of the projecting portion and a center of the mold hole. As a result, because the resin flowing on the front and back faces of the tape is directed to the portions clamped by the support members where deformation of the peripheral edge of the attachment hole of the tape is the smallest at the first stage in the molding, the waving of the peripheral edge of the attachment hole can be further decreased.

It is further preferable that the engaging portion has at least one split groove, and the split groove has an arc-shaped face at a bottom portion of the split groove and stepped plane faces facing each other and having two or more steps with a distance between the stepped plane faces increasing from the arc-shaped face toward an tip end of the engaging head. With this shape of the split groove, it is possible to make the shape of the molded engaging portion to approximate a shape of the cavity without being affected by sink in the molding, and a size of a resilient deformation of the engaging portion is increased, thereby enabling the male member to be smoothly engaged with and detached from the female member.

According to a second aspect of the present invention, there is provides a manufacturing method of the snap fastener with tape having the above structure.

According to the second aspect of the invention, there is provided manufacturing method of a snap fastener with tape for integrally molding a male or female button made of synthetic resin on front and back faces of tape such that the male or female button holds a peripheral edge of an attachment hole of the tape having at least one attachment hole, comprising the steps of fixing the tape with the attachment hole in position between cavities of a fixed mold and a movable mold, closing the movable mold and clamping a tape portion of the peripheral edge of the attachment hole by at least a pair of clamping members projecting to face each other in the cavities of the molds, forming an introducing passage for introducing molten resin through a center portion of the attachment hole of the tape and at least one molten resin guide passage for supplying the molten resin radially or linearly from the introducing passage as a center toward the peripheral edge of the attachment hole, and injecting the molten resin into the cavity through the molten resin guide passage toward the peripheral edge of the attachment hole of the tape.

In this aspect of the invention, a proper degree of waving of the peripheral edge of the attachment hole of the tape can be obtained to increase a strength of securing of the female button to the tape, similarly to the above U.S. patent as described above. Further, because the cut-out is formed at the portion of the inner peripheral engaging face of the engaging opening, the gate in the molding can be formed on the bottom face of the cut-out. Also, the molded product of the gate can be easily fractured and removed by a pushing force generated when the engaging portion of the male button is engaged with the inner peripheral engaging face of the engaging opening of the female button. Because the gate burr is formed on the bottom face of the cut-out, there is no problem in appearance, and the male button can be smoothly engaged with the female button because the gate burr is formed on an inner side of the inner peripheral engaging face.

Preferably, a molten resin outlet portion of the molten resin guide passage is directed to a position of the tape clamped by the clamping members. Because the resin can be introduced into the cavity from a plurality of portions toward the peripheral edge of the attachment hole of the tape in the molding, flows of the resin to the front and back faces of the tape are uniformed, thus a strength of the entire substrate can also be uniformed.

Further, according to the second aspect of the invention, there is provided a manufacturing method wherein the snap fastener is a female member comprising the female button which has an engaging opening at a center portion of the female button and which is integrally molded on the tape, and the method further includes the steps of forming the molten resin outlet portion of the one or more molten resin guide passage to project and open inside the cavity, forming the respective molten resin guide passage independently, and fracturing and removing a molded portion of the molten resin guide passage connected to a bottom portion of the cut-out formed by the molten resin outlet portion(s) in a diameter direction of the female button in a portion of an inner peripheral engaging face of the engaging opening, by engaging the engaging portion of the male button with the engaging opening of the female button. Therefore, the female member can be stably manufactured.

Furthermore, according to the second aspect of the invention, there is provided a manufacturing method wherein the snap fastener is a male member comprising the male button which is in a substantially T-shape in section and has an engaging portion to be engaged with the female button at a center portion of the male button, and which is molded integrally with the tape, and the method further includes steps of forming the introducing passage to directly open into a cavity face opposite to a cavity face for molding the engaging portion to form an opening, forming in the same opposite cavity face at least one molten resin guide passage having at least one wedge-shaped recessed groove with an end communicating with the opening of the introducing passage and a tip end thereof directed to the peripheral edge of the attachment hole of the tape, forming the opening near a plane including the attachment hole of the tape, and fracturing and removing a molded portion of the introducing passage. Therefore, the male member can be stably manufactured According to a third aspect of the present invention, there is provided a mold of a snap fastener with tape for molding a male or female button made of synthetic resin integrally with front and back faces of tape such that the male or female button holds a peripheral edge of an attachment hole of the tape having at least one attachment hole, comprising a first mold, a second mold, a tape inserting passage formed in the mold, at least one snap fastener molding cavity formed in the tape inserting passage, at least one pair of clamping members projecting from such positions in the cavity that the clamping members can clamp the peripheral edge of the attachment hole of the tape and facing each other with a distance for clamping the tape kept therebetween, an introducing passage for introducing molten resin from a center portion of the attachment hole of the tape, and at least one molten resin guide passage formed to extend radially or linearly from the introducing passage as a center toward the peripheral edge of the attachment hole. Preferably, a molten resin outlet portion of the molten resin guide passage faces a position of the tape clamped by the clamping members.

Further, according to the third aspect of the invention, there is provided a mold, wherein the snap fastener is a female member comprising the female button which has an engaging opening at a center portion of the female button and is molded integrally with the tape, the molten resin guide passage is formed independently, the molten resin outlet portion has an opening projecting into the cavity, and the opening is a pinpoint gate.

Furthermore, according to the third aspect of the invention, there is provided a mold, wherein the snap fastener is a male member comprising the male button which has an engaging portion to be engaged with a female member at a center portion of the male button, has a substantially T-shape in section, and is molded integrally with the tape, the introducing passage directly opens into a cavity face opposite to a cavity face for molding the engaging portion to form an opening, an end of the molten resin guide passage communicates with the opening of the introducing passage, a tip end of the molten resin guide passage comprises at least one wedge-shaped recessed groove directed to the peripheral edge of the attachment hole of the tape, the opening is formed at a position near a plane including the attachment hole of the tape, and the introducing passage is in a shape of a beheaded cone.

DESCRIPTION OF THE PREFERRED EMBODIMENTS

Figure 1:
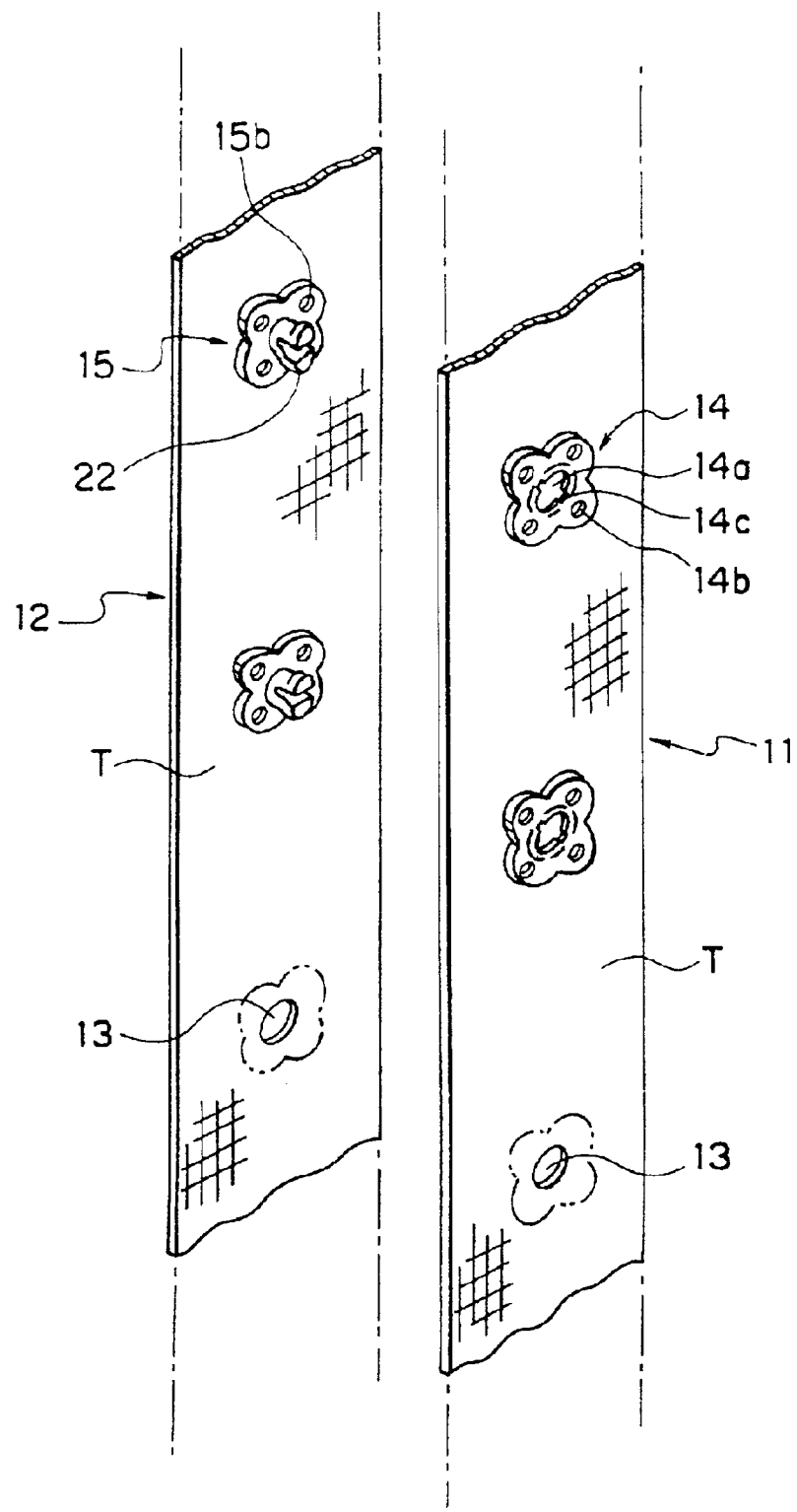
FIG. 1 is a perspective view showing a female member and a male member which constitutes a snap fastener with tape according to this invention, the two members being disposed side by side.

Preferred embodiments of a snap fastener with tape according to the present invention, and a manufacturing method and a mold of the snap fastener will be described in detail below by reference to the accompanying drawings. FIG. 1 is a perspective view of a portion of male and female members disposed side by side and constituting the snap fastener with tape according to the invention, the members being integrally molded on the tape.

As shown in FIG. 1, the snap fastener with tape of the invention comprises the female member 11 and the male member 12, and a basic principle of the method for manufacturing the members 11 and 12 follows the manufacturing method disclosed in the above U.S. Pat. No. 2,821,764. In other words, a plurality of attachment holes 13 are formed in a long tape T at predetermined intervals. Then the tape T is supplied into a mold. Thereafter, a female button 14 and a male button 15 are integrally molded on front and back faces of the tape T so as to hold a peripheral edge of the attachment hole 13 by injection molding. At that time, the peripheral edge of the attachment hole 13 is clamped from the front and back faces by tape support members (pins) projecting to face each other inside a cavity for molding a button in the mold. Then molten resin is introduced toward the peripheral edge of the attachment hole 13. An introducing pressure of the resin is equally distributed to the front and back faces of the tape T. As a result, the female or male button 14, 15 made of synthetic resin is integrally molded to be firmly secured to the peripheral edge of the attachment hole 13 of the tape T, while a proper degree of waving phenomenon is generated in a peripheral edge tape portion of the attachment hole 13.

Figure 2:
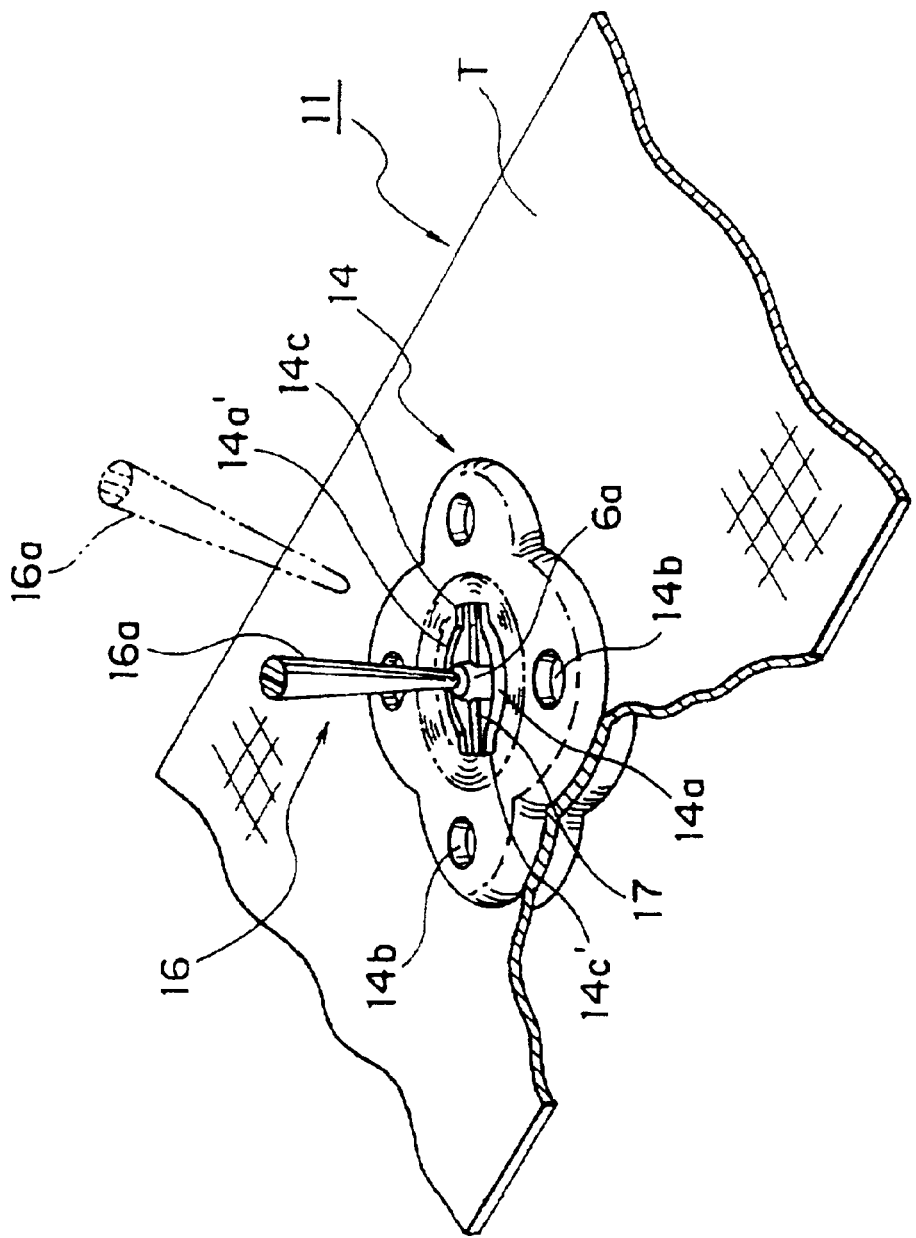
FIG. 2 is a perspective view of a part of the female member of a snap fastener in molding according to a first embodiment of this invention.

FIG. 2 shows a representative shape of the female member 11 immediately after molding, according to this embodiment. According to FIG. 2, an engaging opening 14a to be engaged with the male button 15 is not completely formed at a center portion of the female button 14. Specifically, the female button 14 has such an outline shape that four arc-shaped portions are continuously connected to each other at their outer peripheries to form a flower-like entire shape, and the female button 14 has the engaging opening 14a at the center portion thereof. At an intermediate portion in a direction of a thickness of the engaging hole 14a, the attachment hole 13 of the tape T extends to reach the vicinity of the engaging opening 14a. The female button 14 integrally secures the tape T to hold the attachment hole 13 with the attachment hole 13 being disposed at a center of the female button 14. In the present embodiment, similarly to the above U.S. patent, a number of mold holes 14b molded by clamping members projecting in the cavity are formed at substantially center portions of front and back faces of the arc portions of the female button 14, extending in a front and back direction. The tape T is disposed extending between each pair of the mold holes 14b of the female and the male buttons 14, 15 facing each other.

On the female button 14 of this embodiment in the molding, a molded runner 16 and a molded gate 17 are simultaneously molded by a molten resin passage comprising a runner 4 and a gate 6 (FIG. 5) of the mold. Tip ends of the molded gate 17 are each connected to a substantially central portion of a bottom face 14c' of a cut-out 14c which is a characteristic portion of the present invention and is molded in the inner peripheral engaging face 14a' of the engaging opening 14a of the female button 14. The molded runner 16 is automatically fractured and separated from the molded gate 17 at the time of opening of the mold as described later, and the molded gate 17 connected to the female button 14 is automatically fractured and removed when the male button 15 is engaged with the female button 14 as described later.

Figure 3:
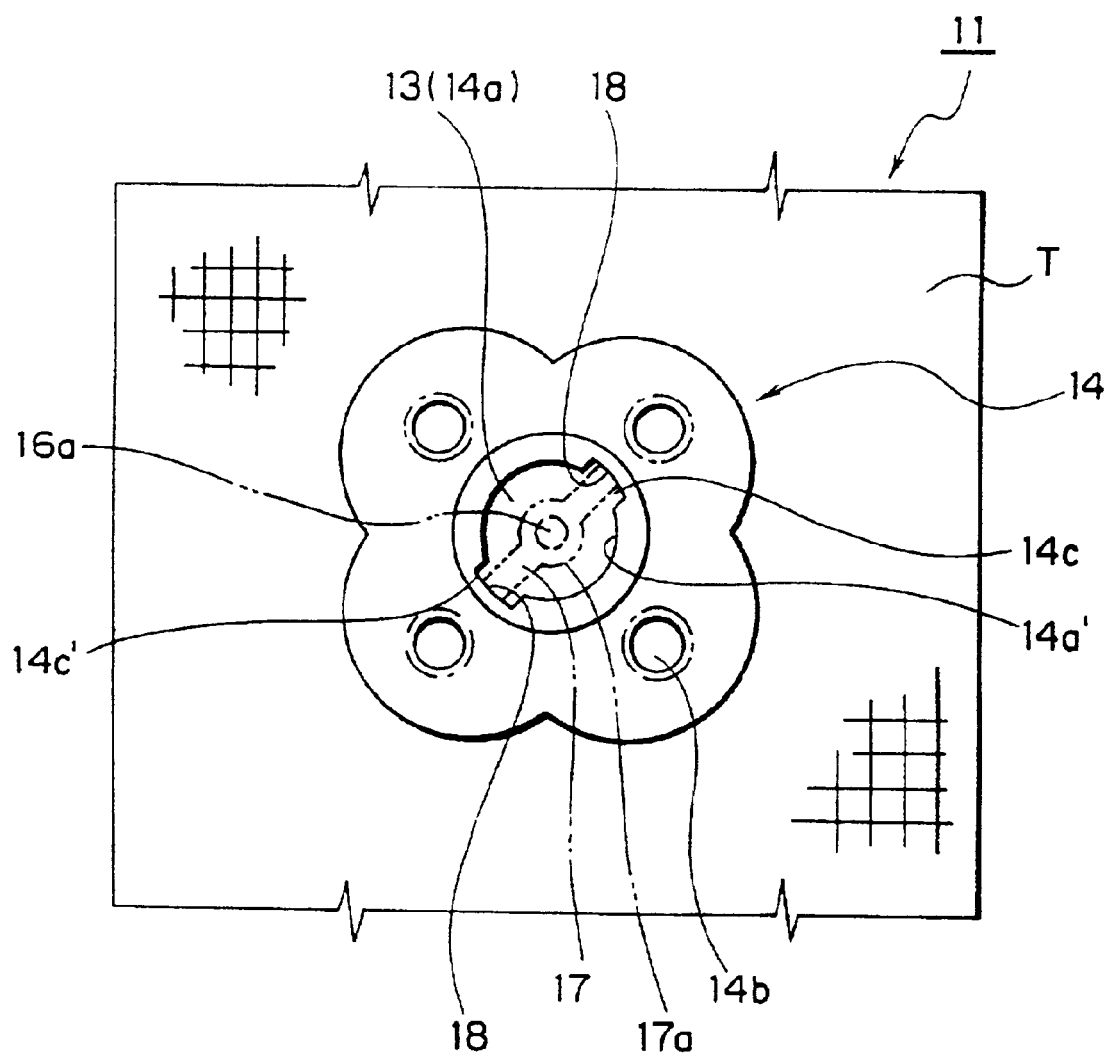
FIG. 3 is a plan view of a part of the female member.

FIG. 3 shows an example of a plan shape of a portion of the female member 11 as a final product wherein the molded gate 17 is removed from the female button 14. In this embodiment, because the molded gate 17 has an entire shape of a wedge wherein a cross sectional area of a portion of the molded gate 17 connected to the female button 14 is set at as small value as possible, the molded gate 17 can be reliably fractured and removed when the male button 15 is engaged with the female button 14. Also, in this embodiment, the cut-outs 14c are formed to be recessed toward two opposed mold holes 14b out of four mold holes 14b formed by the support members on a straight line connecting the molded runner 16 and the two mold holes 14b.

Because of the cut-outs 14c, as described above, it is possible to prevent burrs (gate burrs 18) of the fractured and removed molded gate 17 from remaining on the inner peripheral engaging face 14a' of the engaging opening 14a of the female button 14. The inner peripheral engaging face 14a' is brought into direct contact with an engaging portion 22 of the male button 15 at the time of engagement and detachment of the male button 15. By forming the gate burrs 18 on the bottom faces 14c' of the cut-outs 14c, the trimming can be omitted in succeeding steps. Further, by partially interrupting the inner peripheral engaging face 14a' extending continuously in a ring shape due to the existence of the cut-outs 14c, the female button 14 and the male button 15 can be further smoothly engaged and detached with and from each other.

Because the molded gate 17 and the bottom faces 14c' of the cut-outs 14c are connected to each other at substantially centers of the bottom faces 14c' and the molded gates 17 are molded on straight lines connecting a center of the engaging opening 14a and the mold holes 14b, the introducing pressure of the molten resin introduced into the mold cavity is positively directed to the front and back faces of the tape T at the peripheral edge of the attachment hole of the tape T and to the tape support members (pins) projecting in the cavity. Therefore, it is possible to quickly distribute a flow of the molten resin to an entire periphery of the attachment hole 13, and to obtain the proper degree of waving at the peripheral edge of the attachment hole of the tape T.

Figure 4:
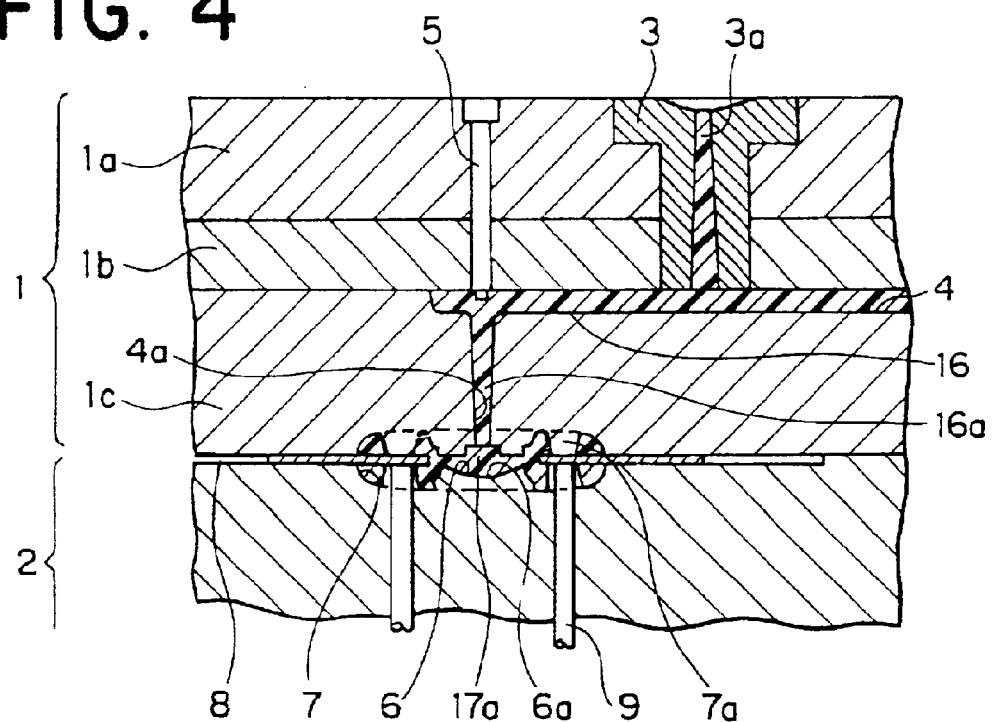
FIG. 4 is a sectional view showing a mold of the female member and a resin being introduced into the mold.
Figure 5:
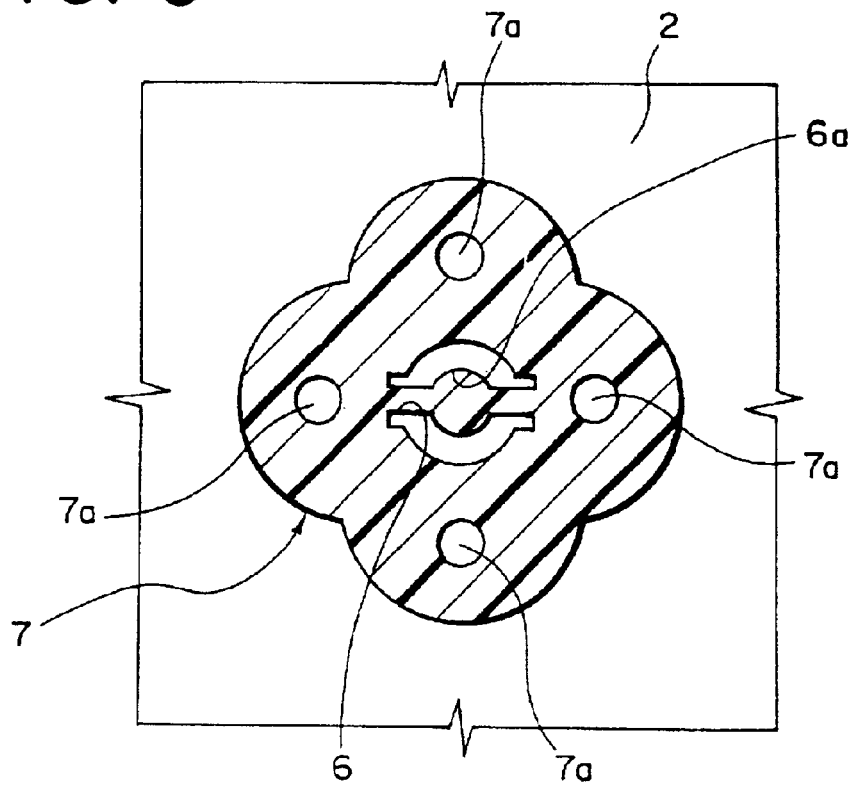
FIG. 5 is a plan view showing a plan sectional shape of the female button in a cavity formed in a fixed mold of the mold.

FIGS. 4 and 5 show an example of the mold for molding the female button 14 integrally with the tape T. In this example, the mold comprises a first mold (movable mold) 1 which is movable upward and downward and a second mold (fixed mold) 2. The first mold 1 comprises three plates laminated for moving upward and downward relative to each other. An upper plate 1a is a movable side mounting plate movable upward and downward by an elevating means (such as a fluid-pressure cylinder) (not shown) relative to a base frame, and an intermediate plate 1b and a lower plate 1c are independently movable upward and downward relative to the movable side mounting plate 1a. On the other hand, the second mold 2 comprises an independent plate fixed to a base.

A substantially upper half of a sprue bushing 3 having a sprue 3a is fitted and fixed to in the movable mounting side plate 1a which is the upper plate by a general process. A substantially lower half of the sprue bushing 3 is slidably fitted to a stripper plate 1b which is the intermediate plate. In the lower plate 1c, a runner 4 communicating with the sprue 3a is formed perpendicularly to a moving direction of the tape T, and the runner 4 has at an end thereof a sub runner 4a extending downward perpendicularly to the runner 4. A runner lock pin 5 is mounted on an extension of the sub runner 4a in the movable side mounting plate 1a and the stripper plate 1b.

A gate 6 horizontally and linearly extending through a resin reservoir 6a is defined at a lower end of the sub runner 4a. In this embodiment, as shown in FIG. 5, there are two gates 6 extending to left and right from the resin reservoir 6a as a center, and each gate 6 is what is called a pinpoint gate in a shape of a wedge wherein a section of the gate decreases from the resin reservoir 6a toward a tip end of the gate 6. The resin reservoir 6a of the embodiment corresponds to a molten resin introducing passage of the invention, and the gates 6 correspond to the molten resin guide passage of the invention. Therefore, molten resin outlet portions of the invention are tip ends of the gates 6.

At the tip ends of the gates 6, a cavity 7 for molding the female button 14 is defined. In the embodiment, the molding cavity 7 is defined in the lower plate 1*c* and the fixed mold 2 which is the second mold, and the resin reservoir 6*a* and lower half portions of the gates 6 are formed in the fixed mold 2. In an area of the fixed mold 2 wherein a portion of the cavity 7 is defined, the tape inserting passage 8 extending in the moving direction of the tape T (a direction perpendicular to a sheet face of FIG. 4) is formed.

As shown in FIGS. 4 and 5, the cavity 7 for forming the female button comprises a flower-shaped molding space and a center portion of the cavity 7 is a substantially circular solid portion connected to the gates 6 including the resin reservoir 6*a* defined at a center of the gates 6. The ring-shaped space has pins 7*a* which are four pairs of tape support members projecting from above toward an inner portion of the mold with phase differences of 90°. A distance between the upper and lower pins 7*a* of each pair is set at a sufficient size to clamp the tape T. In the embodiment, insertion holes for eject pins 9 are formed along axial lines of the pins 7*a* facing the gates 6 of the fixed mold 2, such that the eject pins 9 can move for sliding upward and downward in the pins 7*a* by eject pin elevating means (not shown).

Furthermore, in the embodiment, connecting portions of the gates 6 and the cavity 7 are positioned on a straight line connecting a center of the resin reservoir 6*a* and a distance between the two opposed pairs of the upper and lower pins 7*a*, and the gates 6 face the peripheral edge of the tape T. The connecting portions are formed to project to an inner portion of the cavity 7 so as to mold the cut-outs 14*c* which are partially recessed in an outward direction of a circle of the engaging opening 14*a* of the female button 14.

A manufacturing procedure of the female member 11 by using a molding apparatus having the mold of the embodiment with the above structure will now be described. First, an injection nozzle (not shown) of an injection device is brought into contact with the sprue bushing 3 in a state wherein the entire mold is closed as shown in FIG. 4. Then, injection is carried out, and the molten resin is introduced into the cavity 7 for molding the female button 14 through the sprue 3, the runner 4, the sub runner 4*a*, the resin reservoir 6*a*, and the gates 6.

In the injection, the molten resin introduced into the cavity 7 flows from the tip ends of the gates 6 toward the peripheral edge of the attachment hole 13 of the tape T, and is distributed to the front and back faces of the tape T. Then, the molten resin is filled into the entire cavity while being flown to the peripheral edge portion of the mold holes 14*b* around the opposed pins 7*a*. At this time, the peripheral edge of the attachment hole 13 of the tape T except for portions clamped by the pins 7*a* is buried integrally in the molten resin while waving slightly due to a flow pressure of the resin.

When the injected resin is hardened by cooling, the movable side mounting plate 1*a* and the stripper plate 1*b* are elevated together, and the molded runner 16 is separated from the lower plate 1*c* together with the sub molded runner 16*a* while being supported by the runner lock pin 5. At this time, the lower end of the sub runner 16*a* is fractured and separated from an upper end of a molded resin reservoir, i.e. a projecting portion 17*a* by the separating force to separate the molded runner 16. Then, the stripper plate 1*b* slightly moves to release the molded runner 16 from the runner lock pin 5 and to separate the molded runner 16 from the mold together with a molded sprue.

When this release is completed, the lower plate 1*c* moves upward to open the mold, and at substantially the same time, the eject pins 9 slightly move upward, push up the tape T exposed at intermediate portions of the mold holes 14*b* molded by the support pins 7*a*, and push the female button 14 and the molded gate 17 out of the mold. The molded female member 11 at this time is in a shape as shown in FIG. 2 with the molded sub runner 16*a* being fractured and separated. Because the molded gate 17 remaining on the female button 14 is connected to the bottom faces 14*c*' of the cut-outs 14*c* of the female button 14 through very small portions, the molded gate 17 can be automatically fractured and removed when the engaging portion 22 of the male button 15 is engaged with the female button 14 as described above. The fractured burrs (gate burrs 18) of the molded gate 17 formed at the time of the fracture removal are formed at the bottom faces of the cut-outs 14*c*, and thus, can not be easily seen from outside. Also, because fracture faces of the burrs 18 are not formed on the inner peripheral engaging face 14*a*' which is directly engaged with and detached from the engaging portion 22 (FIG. 1) of the male button 15 and the circular engaging face 14*a*' is partially divided by the cut-outs 14*c*, the female button 14 can be further smoothly engaged with the male button 15.

Figure 6:
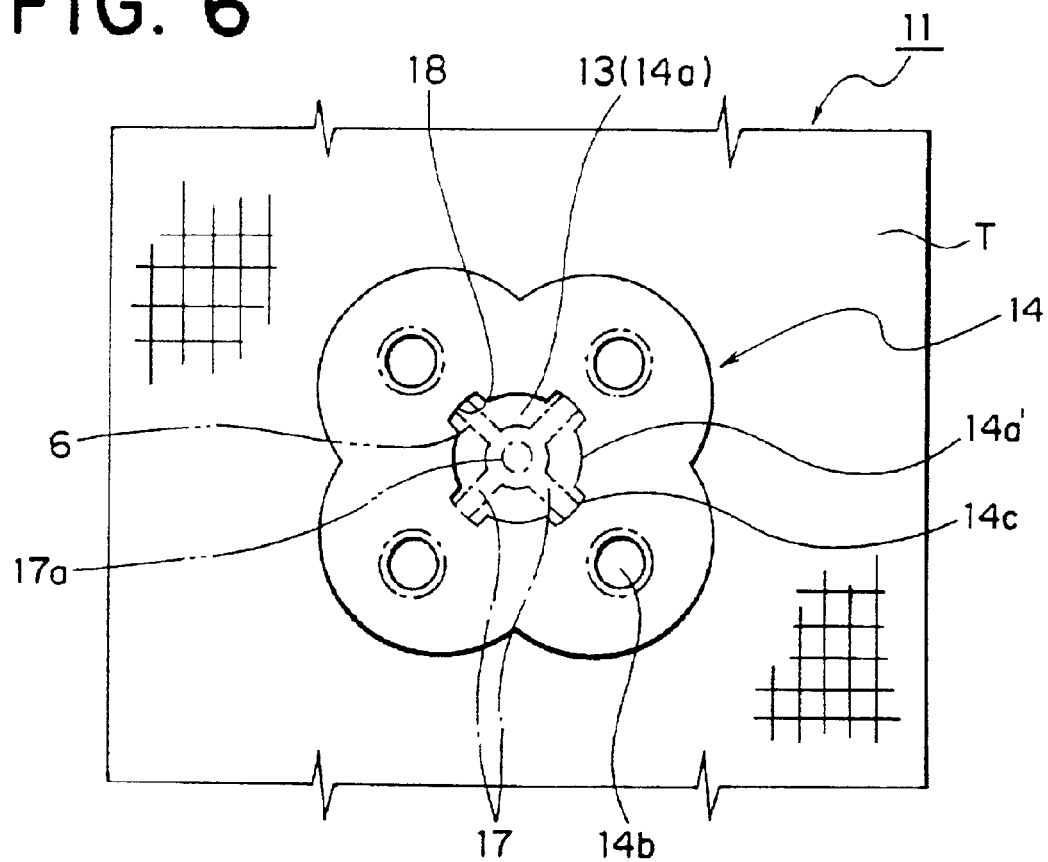
FIG. 6 is a plan view showing a modified example of the female member.

FIG. 6 shows a modification of the female button 14, which is different from the above embodiment in that the female button 14 is molded by using a mold wherein four gates 6 are formed in a cross shape with a resin reservoir 6*a* defined at a center. As a result, four introducing portions which introduce the resin into the cavity 7 to the peripheral edge of the attachment hole of the tape T are formed. Therefore, as compared with the above embodiment, the resin can flow more smoothly, and the female button 14 can be stably and integrally molded with the tape T. Also, because the inner peripheral engaging face 14*a*' of the substantially circular engaging opening 14*a* is divided evenly at four positions in its peripheral direction, the female button 14 can be engaged with the male engaging button 15 further smoothly as compared with the above embodiment.

The female member 11 and the manufacturing method and the mold of the female member 11, as described above, are representative embodiments according to the invention. The manufacturing method and the mold of the male member 12 of the invention are based on the same technical idea to that of the above embodiment. Next, a representative embodiment of the male member 12 and the manufacturing method and the mold of the male member 12 will now be specifically described by reference to the drawings. In the following descriptions, like reference numbers will be allocated to parts substantially similar to those of the female member 11 described in the above embodiment.

Figure 7:
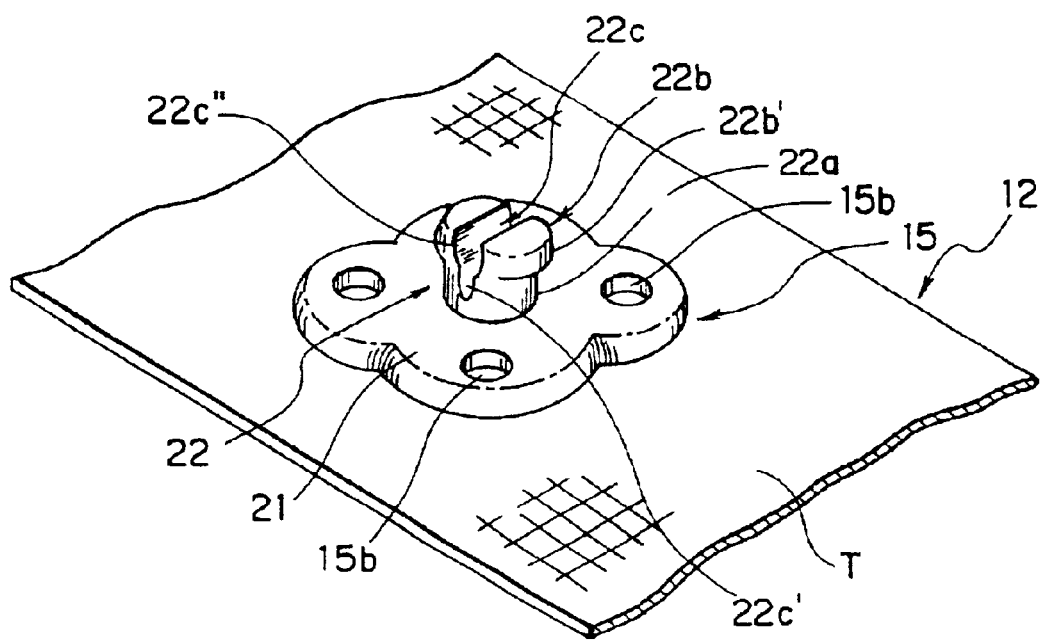
FIG. 7 is a perspective view of a front face of a part of a male member according to a second embodiment of the invention.
Figure 8:
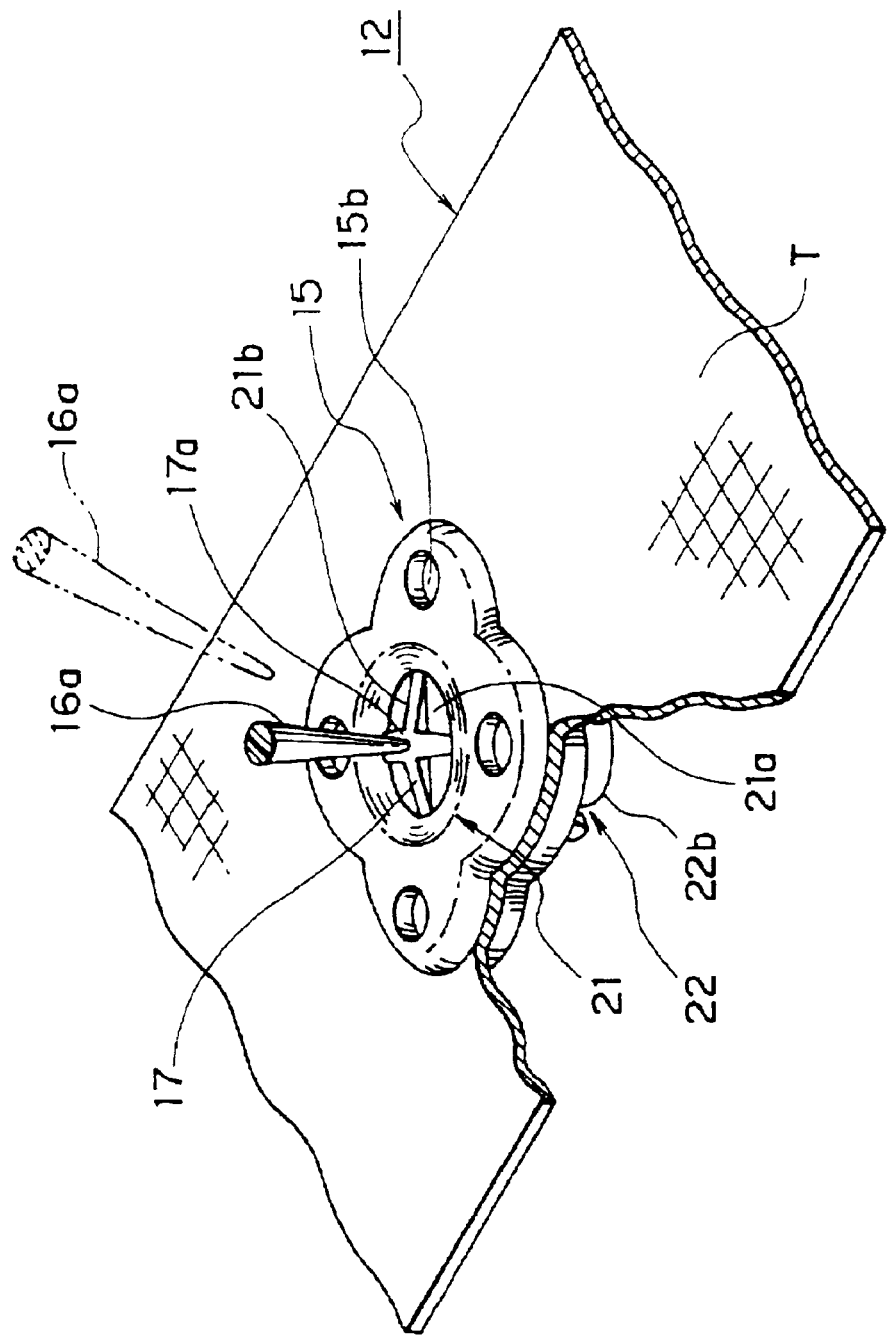
FIG. 8 is a perspective view of a back face of the male member immediately after molding.

FIGS. 7 and 8 are perspective views of front and back faces of the male member 12 of the invention. In FIG. 8 showing a surface opposite to a side from which the engaging portion 22 of the male button 15 projects, the molded gate 17 in the molding is connected to the male button 15. Mold holes 15*b* molded in the molding by the tape support members (pins) for supporting the peripheral edge of the attachment hole 13 of the tape T are formed in the male button 15.

The male button 15 of this embodiment is basically different from the above female button 14 in that a substrate 21 closes the engaging opening 14*a* of the female button 14, that the engaging portion 22 to be engaged with the engaging opening 14*a* of the female button 14 is formed to project from one surface of the substrate 21, and that a recess 21*a* is formed on a back face side of the substrate of the engaging portion 22.

The engaging portion 22 comprises a neck portion 22a directly standing from the substrate 21 and an engaging head 22b connected to a tip end of the neck portion 22a. The engaging portion 22 is divided into two by a split groove 22c formed to extend from a midway portion of the neck portion 22a up to the engaging head 22b. The split groove 22c is in such a shape that a groove bottom face arcs, as apparent from a structure shown by a solid line in FIG. 10, and a smaller-groove width portion 22c' and a larger-groove width portion 22c' are continuously formed through an arc-shaped step from the arced face toward an upper end of the engaging head 22b.

Figure 10:
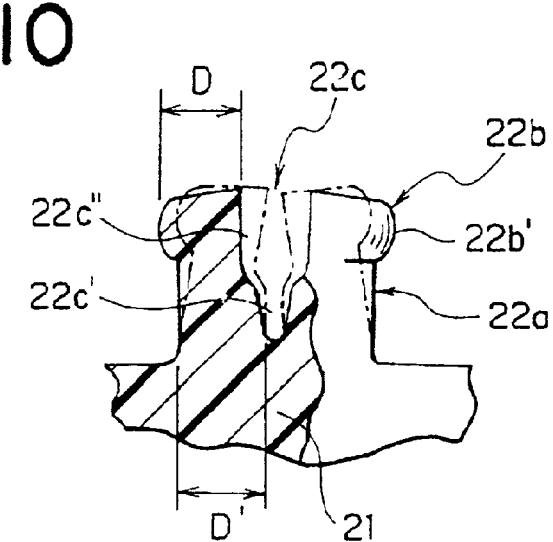
FIG. 10 is a front view, partly in section, of an example of a shape of an engaging portion of a male button molded integrally with the male member with a portion cut.
Figure 11:
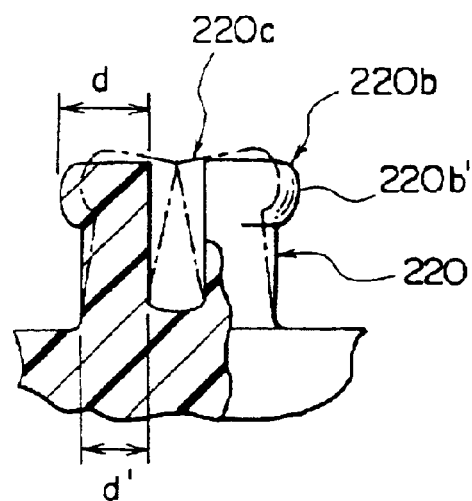
FIG. 11 is a front view of an example of a shape of an engaging portion of a known male button with a portion cut.
Figure 12:
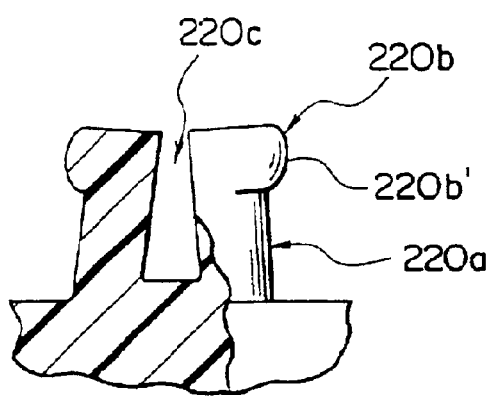
FIG. 12 is a front view, partly in section, of a shape of an engaging portion of the known male button immediately after molding.

FIGS. 11 and 12 show an advantage of the groove shape of the split groove 22c in comparison with a shape of a conventional split groove. With the above-described shape of the split groove 22c in the engaging head 22b of the male button 15 of the invention as shown in FIG. 10, due to the fact that a thickness D of a bulging portion 22b' of the engaging head 22b in a bulging direction is substantially equal to a thickness D' of the groove bottom portion in a diameter direction thereof and that the groove bottom portion has a small thickness, an influence of sink due to contraction after molding is small, and a portion of the left and right portions of the divided neck portion 22a and the engaging head portions 22b stand substantially in parallel to each other even after the molding.

However, in the case of the conventional split groove shown in FIG. 11 which has a simple rectangular shape in section, a thickness d of a bulging portion 220b' of an engaging head 220b in a bulging direction is thicker than a thickness d' of a portion of a neck portion 220a divided into left and right portions and the engaging head portion 220b, and a groove width of a groove bottom portion is relatively larger than the other groove width. As a result, the engaging head portions 220b divided into left and right portions are deformed toward each other after molding as shown in FIG. 12. This causes an engaging force of the male button 15 for being engaged with the companion female button 14 to decrease, and thus, the male button 15 is easily detached from the female button 14 as compared with the present invention.

Furthermore, as understood from positions of phantom lines shown in FIGS. 10 and 11, the engaging portion of the invention with the above split groove shape can be further largely deformed resiliently as compared with the conventional engaging portion with the split shape, thereby facilitating an engaging operation of the male button 15 with the female button 14 and ensuring a necessary engaging force.

Figure 9:
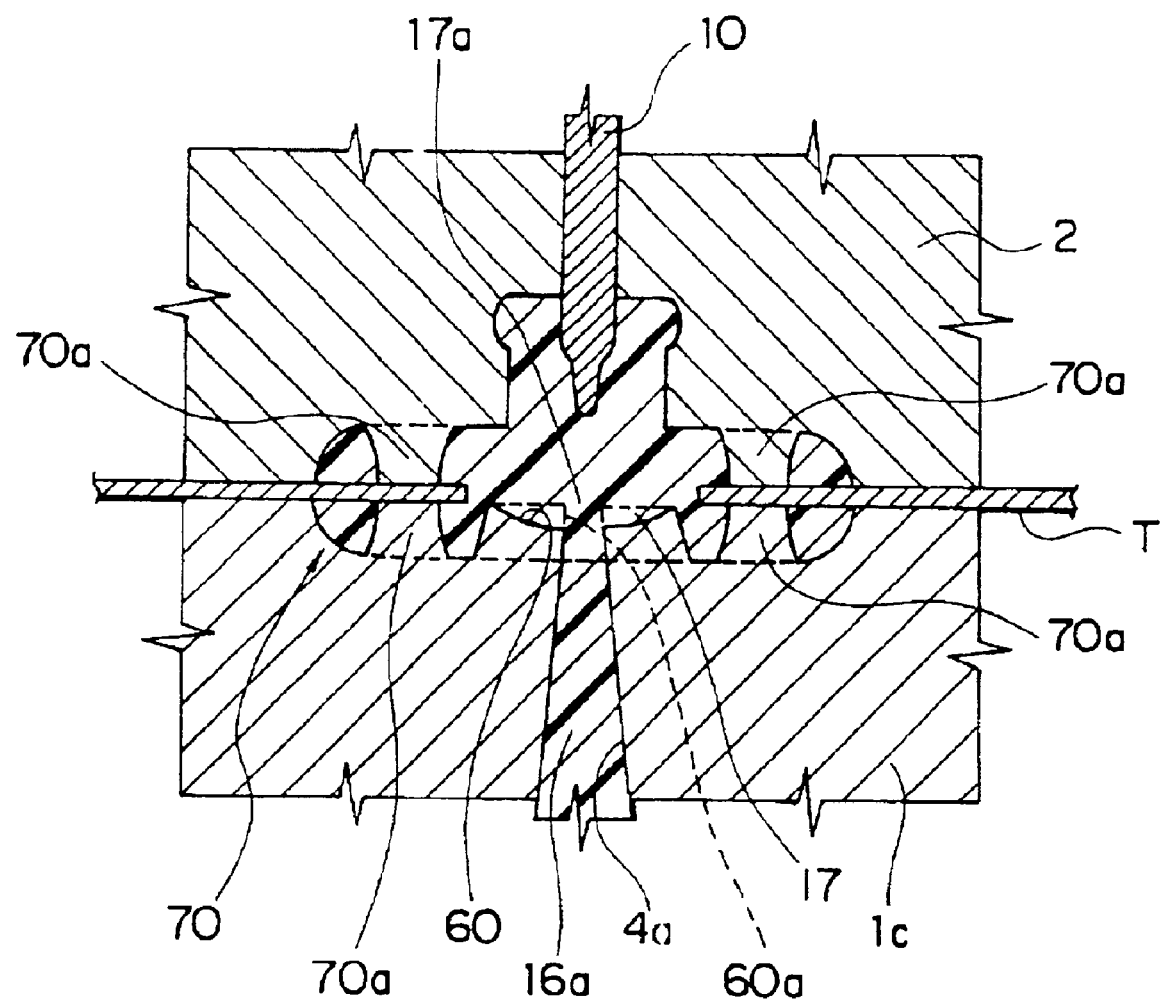
FIG. 9 is a sectional view showing a main portion of a mold of the male member.

FIG. 8 is a perspective view of a face of the above male member 12 on a side where the engaging portion 22 is not projecting, wherein the molded sub runner 16a is still connected to the male member 12 in the molding as described above. In the invention, it is necessary to direct as much molten resin introduced into the cavity to the peripheral edge of the attachment hole of the tape T clamped by the support pins 70a as possible, according to the U.S. patent. Therefore, in the embodiment, a face (hereinafter referred to as a back face) of the substrate 21 opposite to a side from which the engaging portion 22 projects is made the most equal in lever with a plane including the peripheral edge of the attachment hole of the tape T, as shown in FIG. 9.

As a result, a thickness of the substrate 21 is substantially a half of a thickness of the male button 15, and the back face of the substrate 21 is recessed toward a front face thereof from the back face of the male button 15 to reduce its thickness by half to form a recess 21a. Furthermore, in the embodiment, in order to positively direct the resin introduced into the cavity 70 to the peripheral edge of the tape T, four wedge-shaped molten rein guide passages 60 with a sectional U-shape is provided extending radially from a resin reservoir 60a connected to a sub runner 4a at a center of a substrate molding portion and are adjacent to the cavity 70 in the mold as shown by a broken line in FIG. 9. In the embodiment, four pairs of upper and lower support pins 70a for supporting the peripheral edge of the attachment hole 13 of the tape T inserted through the cavity 70 are formed to project from an inside face of the cavity 70. The molten resin guide passages 60 are disposed on straight lines connecting centers of the support pins 70a and a center of the resin reservoir 60a.

With the above structure of the mold, wedge-shaped ribs 21b having a cross shape are formed on the back face of the substrate 21 as shown in FIG. 8. As apparent from FIG. 9, because the sub runner 4a opens at the center of the molten resin reservoir 60a, a burr 19 is defined, at the time of fracture separating of the molded sub runner 16a, at a center portion of a molded molten resin reservoir, a projecting portion 17a molded at a center of the four ribs 21b positioned in the recess 21a of the male button 15, resulting in no disadvantage in terms of appearance.

A manufacturing method of the male member 12 of the embodiment having the above shape is substantially the same as that of the above female member 11. Therefore, like reference numbers are allocated to parts substantially similar to those of the mold of the female member 11, and descriptions of the similar parts are omitted here. As described above, the cavity 70 for molding the male member 11 is different from the above cavity 7 for molding the female button 14 in that the cavity 70 has a portion for molding the substrate 21 and a portion for molding the engaging portion 22 projecting on the front face side, as described above. Furthermore, spaces for molding the wedge-shaped ribs 21b are formed by a portion of the cavity 70. In other words, in the mold for molding the female button 14, the molten resin guide passage 60 is formed by the gates 6, but the molten resin guide passages 60 in the mold for molding the male button 15 constitute a portion of the cavity 70. As shown in FIG. 9, rib-molding wedge-shaped grooves which are the molten resin guide passages 60 are formed in the lower plate 1c which is a movable mold 1.

In order to mold the split groove 22c in the engaging portion 22 in the embodiment, a sliding core 10 which is slidable perpendicularly to a sheet face to cross the cavity portion for molding the engaging portion 22, as show in FIG. 9.

Steps for operating a first mold 1 and a second mold 2 for molding the male button 15 having the above structure are similar to those for molding the female button 14. Before pushing the molded male button out of the second mold 2, which is a fixed mold, by eject pins (not shown), i.e., simultaneously with starting of a mold opening operation of the lower plate 1c, the sliding core 10 is activated. When the sliding core 10 is separated from the cavity portion for molding the engaging portion 22, the eject pins (not shown) are activated to push the molded male button out of the fixed mold 2. At the time of pushing out of the molded male button, a portion of the neck portion 22a and the engaging head portions 22b of the engaging portion 22 are deformed to narrow the split groove 22c, thereby easily pushing the male button 15 out of the mold.

Figure 13:
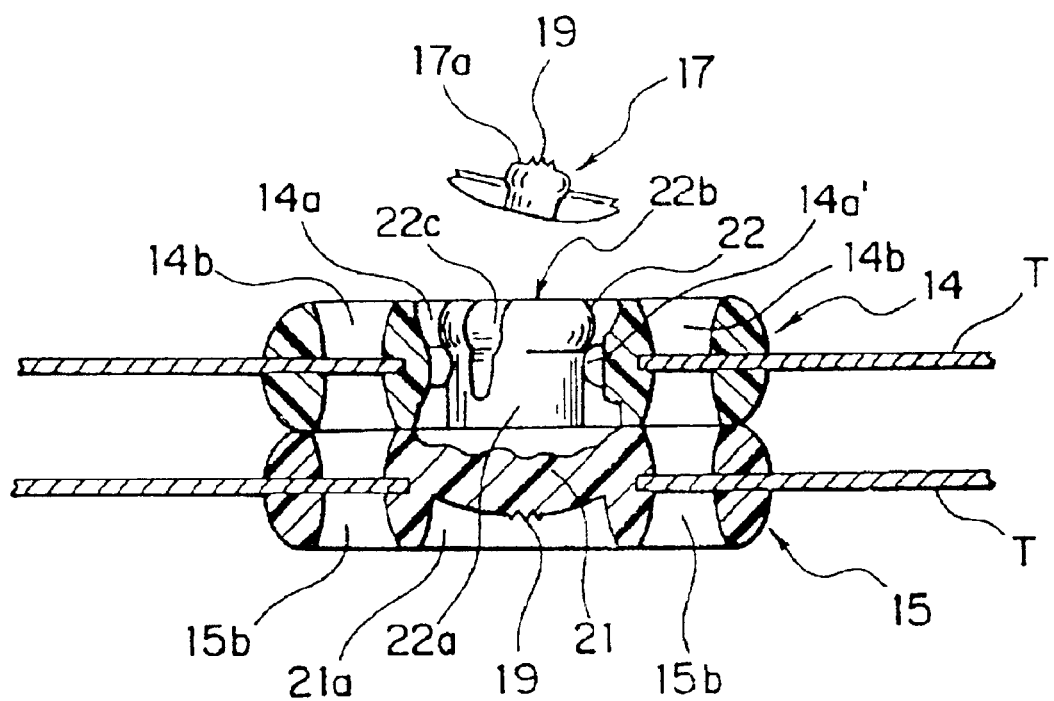
FIG. 13 is a sectional view showing an engaged state of both of the buttons and a fracture separating mechanism of a gate connected to the female button by the male button.

When the male button 15 is engaged with the female button 14 molded integrally with the tape T wherein the gates 6 still remains, as shown in FIG. 13, the gates 6 connected to the engaging opening 14a are automatically fractured and removed by a force pushing the engaging portion 22 of the male button 15 into the engaging opening 14a of the female button 14.

The above descriptions are only for the typical embodiments of the present invention, and it will be understood from the above descriptions that the invention should not be limited to the embodiments, and that various modifications and changes may be made within a technical idea of the invention.

What is claimed:

1. A manufacturing method of a snap fastener with tape for integrally molding a female button made of synthetic resin on front and back faces of tape such that the female button holds a peripheral edge of an attachment hole of the tape having at least one attachment hole, comprising the steps of:

fixing the tape with the attachment hole in position between cavities of a fixed mold and a movable mold;

closing the movable mold against the fixed mold and clamping a tape portion of the peripheral edge of the attachment hole by at least a pair of clamping members projecting to face each other in the cavities of the molds;

forming an introducing passage for introducing molten resin through a center portion of the attachment hole of the tape and at least one molten resin guide passage for supplying the molten resin linearly from the introducing passage as a center toward the peripheral edge of the attachment hole;

connecting a portion of the cavities for forming at least one cut-out recessed in a diameter direction of an engaging opening at a center portion of the snap fastener with said at least one molten resin guide passage; and injecting the molten resin into the cavity through the molten resin guide passage toward the peripheral edge of the attachment hole of the tape.

2. A manufacturing method according to claim 1, wherein a molten resin outlet portion of the molten resin guide passage is directed to a position of the tape clamped by the clamping members.

3. A manufacturing method according to claim 1 or 2, wherein the female member comprises the female button which has the engaging opening at a center portion of the female button and which is integrally molded on the tape, and the method further includes the steps of:

forming a molten resin outlet portion of the molten resin guide passage to project and open inside the cavity;

forming the respective molten resin guide passage independently; and fracture removing a molded portion of the molten resin guide passage connected to a bottom portion of the cut-out formed by the molten resin outlet portion in a diameter direction of the female button in a portion of an inner peripheral engaging face of the engaging opening, by engaging an engaging portion of the male button with the engaging opening of the female button.

4. Manufacturing method of a snap fastener with tape for integrally molding a male button made of synthetic resin on front and back faces of tape such that the male button holds a peripheral edge of an attachment hole of the tape having at least one attachment hole, comprising the steps of:

fixing the tape with the attachment hole in position between cavities of a fixed mold and a movable mold;

closing the movable mold against the fixed mold and clamping a tape portion of the peripheral edge of the attachment hole by at least a pair of clamping members projecting to face each other in the cavities of the molds;

forming an introducing passage for introducing molten resin through a center portion of the attachment hole of the tape and at least one molten resin guide passage for supplying the molten resin linearly from the introducing passage as a center toward the peripheral edge of the attachment hole;

forming an opening of the introducing passage to directly open into a cavity face opposite to a cavity face for molding the engaging potion;

forming in the same opposite cavity face at least one or more molten resin guide passages having at least one wedge-shaped recessed groove with an end communicating with the opening of the introducing passage and a tip end thereof directed to the peripheral edge of the attachment hole of the tape;

forming the opening of the introducing passage near a plane including the attachment hole of the tape;

injecting the molten resin into the cavity through the molten resin guide passage toward the peripheral edge of the attachment hole of the tape; and fracturing and removing a molded potion of the introducing passage, wherein the male member comprises the male button which is in a substantially T-shape in section, and has an engaging portion to be engaged with a female button at a center portion of the male button, and which is molded integrally with the tape.

* * * * *

UNITED STATES PATENT AND TRADEMARK OFFICE
CERTIFICATE OF CORRECTION

PATENT NO. : 6,951,626 B2
DATED : October 4, 2005
INVENTOR(S) : Shunji Akashi

It is certified that error appears in the above-identified patent and that said Letters Patent is hereby corrected as shown below:

Column 14,
Lines 31 and 43, "potion" should read -- portion --.

Signed and Sealed this

Twenty-first Day of March, 2006

JON W. DUDAS
*Director of the United States Patent and Trademark Office*